United States Patent
Beifus et al.

(10) Patent No.: US 11,469,704 B2
(45) Date of Patent: Oct. 11, 2022

(54) METHODS AND SYSTEMS FOR RECORDING OPERATING INFORMATION OF AN ELECTRONICALLY COMMUTATED MOTOR

(71) Applicant: Regal Beloit America, Inc., Beloit, WI (US)

(72) Inventors: Brian L. Beifus, Fort Wayne, IN (US); Paul Nathanael Selking, Ossian, IN (US); Vijay Dayaldas Gurudasani, Gujarat (IN); Michael R. Koller, Columbia City, IN (US)

(73) Assignee: REGAL BELOIT AMERICA, INC., Beloit, WI (US)

( * ) Notice: Subject to any disclaimer, the term of this patent is extended or adjusted under 35 U.S.C. 154(b) by 0 days.

(21) Appl. No.: 17/163,990

(22) Filed: Feb. 1, 2021

(65) Prior Publication Data

US 2021/0159837 A1 May 27, 2021
US 2022/0052634 A9 Feb. 17, 2022

Related U.S. Application Data

(63) Continuation of application No. 16/567,570, filed on Sep. 11, 2019, now Pat. No. 10,910,986, which is a
(Continued)

(51) Int. Cl.
*H02P 29/024* (2016.01)
*H02P 6/34* (2016.01)
(Continued)

(52) U.S. Cl.
CPC ........ *H02P 29/024* (2013.01); *G05B 23/0264* (2013.01); *H02P 6/06* (2013.01);
(Continued)

(58) Field of Classification Search
CPC ...... H02P 1/00; H02P 1/04; H02P 1/16; H02P 1/163; H02P 1/18; H02P 1/24; H02P 1/26;
(Continued)

(56) References Cited

U.S. PATENT DOCUMENTS 4,381,457 A  4/1983 Wiles
4,384,243 A  5/1983 Muskovac
(Continued)

FOREIGN PATENT DOCUMENTS

EP  0841574 A2  5/1998
JP  11304534 A  11/1999
(Continued)

OTHER PUBLICATIONS

European Search Report, Application No. EP 08250731 dated May 25, 2010, 7 pgs.
(Continued)

*Primary Examiner* — Antony M Paul
(74) *Attorney, Agent, or Firm* — Armstrong Teasdale LLP

(57) ABSTRACT

A motor controller for an electric motor includes an enclosure and a processing device, memory device, and communication interface disposed within the enclosure. The processing device is configured to control the electric motor and collect operating information from the electric motor during operation of the electric motor. The memory device is communicatively coupled to the processing device. The memory device is configured to receive and store the operating information collected during operation of the electric motor. The communication interface is communicatively coupled to the processing device and the memory device, and is configured to enable access to the operating information stored on the memory device by a computing device disposed remotely from the electric motor.

14 Claims, 4 Drawing Sheets

Related U.S. Application Data continuation of application No. 16/110,229, filed on Aug. 23, 2018, now Pat. No. 10,447,193, which is a continuation of application No. 15/460,686, filed on Mar. 16, 2017, now Pat. No. 10,069,451, which is a continuation of application No. 14/970,169, filed on Dec. 15, 2015, now Pat. No. 9,621,080, which is a continuation of application No. 14/166,541, filed on Jan. 28, 2014, now Pat. No. 9,236,819, which is a continuation of application No. 13/588,607, filed on Aug. 17, 2012, now Pat. No. 8,749,927, which is a continuation of application No. 12/688,443, filed on Jan. 15, 2010, now Pat. No. 8,269,448, which is a continuation of application No. 11/684,245, filed on Mar. 9, 2007, now Pat. No. 7,675,257.

(51) Int. Cl.
  *G05B 23/02* (2006.01)
  *H02P 29/02* (2016.01)
  *H02P 6/06* (2006.01)

(52) U.S. Cl.
  CPC ............... *H02P 6/34* (2016.02); *H02P 29/02* (2013.01); *H02P 29/0241* (2016.02); *G05B 2219/23193* (2013.01); *G05B 2219/24053* (2013.01); *G05B 2219/24067* (2013.01)

(58) Field of Classification Search
  CPC .... H02P 1/42; H02P 1/46; H02P 1/465; H02P 1/54; H02P 3/00; H02P 6/00; H02P 6/12; H02P 6/17; H02P 6/26; H02P 6/28; H02P 7/00; H02P 7/265; H02P 8/00; H02P 21/00; H02P 21/0025; H02P 21/20; H02P 23/0031; H02P 23/07; H02P 23/14; H02P 25/062; H02P 25/064; H02P 25/086; H02P 25/08; H02P 27/00; H02P 27/04; H02P 27/06; H02P 29/00; H02P 29/024; H02P 29/64; H02P 29/02; H02P 23/0264; H02P 2219/23193
  See application file for complete search history.

(56) References Cited

U.S. PATENT DOCUMENTS

| | | | |
|---|---|---|---|
| 4,412,160 A | 10/1983 | Kojima et al. | |
| 4,445,198 A | 4/1984 | Eckert | |
| 4,716,286 A | 12/1987 | Taylor | |
| 5,033,010 A | 7/1991 | Lawrence et al. | |
| 5,055,755 A | 10/1991 | Ozawa et al. | |
| 5,251,157 A | 10/1993 | Prather | |
| 5,473,229 A | 12/1995 | Archer et al. | |
| 5,592,058 A | 1/1997 | Archer et al. | |
| 5,744,921 A | 4/1998 | Makaran | |
| 5,884,237 A | 3/1999 | Kanki et al. | |
| 5,917,428 A * | 6/1999 | Discenzo | G01R 31/343 310/68 B |
| 5,936,315 A | 8/1999 | Lais | |
| 5,982,120 A | 11/1999 | Akiyama et al. | |
| 6,041,287 A * | 3/2000 | Dister | G01R 1/04 702/182 |
| 6,118,235 A | 9/2000 | Redlich | |
| 6,124,692 A | 9/2000 | Canada et al. | |
| 6,199,018 B1 | 3/2001 | Quist et al. | |
| 6,262,550 B1 | 7/2001 | Kliman et al. | |
| 6,271,638 B1 | 8/2001 | Erdman et al. | |
| 6,295,510 B1 | 9/2001 | Discenzo | |
| 6,297,742 B1 * | 10/2001 | Canada | G07C 3/00 361/23 |
| 6,453,260 B1 | 9/2002 | Prough | |
| 6,469,920 B2 | 10/2002 | Butler et al. | |
| 6,512,343 B1 | 1/2003 | Yasohara | |
| 6,529,135 B1 * | 3/2003 | Bowers | H02P 23/0077 340/648 |
| 6,529,136 B2 | 3/2003 | Cao et al. | |
| 6,601,015 B1 | 7/2003 | Milvert | |
| 6,640,196 B1 * | 10/2003 | Unsworth | G01R 31/343 702/115 |
| 6,661,684 B2 | 12/2003 | Morita | |
| 6,768,279 B1 | 7/2004 | Skinner et al. | |
| 6,810,292 B1 | 10/2004 | Rappenecker et al. | |
| 6,847,854 B2 * | 1/2005 | Discenzo | G05B 13/024 700/36 |
| 6,895,176 B2 | 5/2005 | Archer et al. | |
| 6,949,899 B2 | 9/2005 | Horng et al. | |
| 6,990,398 B2 | 1/2006 | Kinugawa | |
| 7,005,884 B2 | 2/2006 | Gunton | |
| 7,024,335 B1 * | 4/2006 | Parlos | G05B 23/0283 702/182 |
| 7,095,194 B2 | 8/2006 | Kro et al. | |
| 7,127,373 B2 | 10/2006 | House et al. | |
| 7,135,830 B2 | 11/2006 | El Ibiary | |
| 7,142,990 B2 | 11/2006 | Bouse et al. | |
| 7,145,265 B2 | 12/2006 | Mc Nulty et al. | |
| 7,222,050 B2 | 5/2007 | Kakegawa et al. | |
| 7,298,110 B2 | 11/2007 | Lindsey | |
| 7,342,763 B2 * | 3/2008 | Mladenik | H02H 3/00 361/119 |
| 7,602,132 B2 * | 10/2009 | Davis | H02P 23/0077 318/565 |
| 7,675,257 B2 | 3/2010 | Beifus et al. | |
| 7,797,062 B2 * | 9/2010 | Discenzo | H04L 67/12 700/20 |
| 8,073,588 B2 * | 12/2011 | Peters | G05B 19/106 701/36 |
| 8,314,576 B2 | 11/2012 | Fahimi et al. | |
| 2003/0120441 A1 | 6/2003 | Sotack | |
| 2003/0204777 A1 | 10/2003 | Kojori | |
| 2004/0135534 A1 | 7/2004 | Cullen | |
| 2005/0033577 A1 | 2/2005 | Bradley et al. | |
| 2005/0125090 A1 | 6/2005 | Sakano et al. | |
| 2005/0189892 A1 | 9/2005 | Kokami et al. | |
| 2006/0238388 A1 | 10/2006 | Jayanth | |
| 2007/0078614 A1 | 4/2007 | Discenzo et al. | |

FOREIGN PATENT DOCUMENTS

| | | |
|---|---|---|
| JP | 2004084890 A | 3/2004 |
| WO | 1990005959 A1 | 5/1990 |

OTHER PUBLICATIONS

European Search Report, dated Dec. 14, 2012, for co-pending EP patent application No. EP 12176582 (12 pgs).
First Examination Report from the EPO for co-pending EP application No. EP12176582.0 dated Aug. 5, 2013, 7 pgs.
First Official Communication re: EPO Application No. 08250731.0-2206 dated Feb. 21, 2011, 6 pgs.
National Instruments: "Protecting RS-232 Serial Port from Over-Voltage," Dec. 20, 2006, 1 pg.
Notice of Allowance and Fee(s) Due U.S. Appl. No. 12/688,443 dated May 21, 2012; 9 pgs.
Notice of Allowance dated Oct. 16, 2009 from U.S. Appl. No. 11/684,245, 8 pgs.
Notification of First Office Action dated Dec. 4, 2013 including Search Report re Chinese Patent Application No. 201210250316.7, 15 pgs.
Partial European Search Report, dated Sep. 17, 2012, for co-pending EP patent application No. EP12176582, 8 pgs.
"Protection circuits SP720, SP721, Technical brief TB320, application note AN9304", in: "Transient Voltage Suppression Devices 1994", Aug. 1993 (Aug. 1993), Harris Semiconductur, Melbourne, Florida, USA, pp. 11.6 to 11.15 and 12.15 to 12.21.
"Protection of RS-232 Serial Connections," American Power Conversion, White Paper #16, Jan. 1, 2003, pp. 1-8.
Transient Voltage Suppressor TVS305-TVS430 TVS505-TVS528 Apr. 7, 1996, pp. 4-17-4-20, XP55073550, Watertown, MA 02172, Retrieved from the Internet on Jul. 30, 2013; URL: http://datasheet.iiic.ccmicrosemi/TVS515.pdf.

(56) References Cited

OTHER PUBLICATIONS

Notice of Allowance dated May 9, 2018 from U.S. Appl. No. 15/460,686, 9 pgs.

* cited by examiner

METHODS AND SYSTEMS FOR RECORDING OPERATING INFORMATION OF AN ELECTRONICALLY COMMUTATED MOTOR

CROSS-REFERENCE TO RELATED APPLICATIONS

This application is a continuation of U.S. patent application Ser. No. 16/567,570 filed Sep. 11, 2019, which is a continuation of U.S. Pat. No. 10,447,193 filed Aug. 23, 2018, which is a continuation of U.S. Pat. No. 10,069,451, filed Mar. 16, 2017, which is a continuation of to U.S. Pat. No. 9,621,080, filed Dec. 15, 2015, which is a continuation of U.S. Pat. No. 9,236,819, filed on Jan. 28, 2014, which is a continuation of U.S. Pat. No. 8,749,927, filed Aug. 17, 2012, which is a continuation of U.S. Pat. No. 8,269,448, filed Jan. 15, 2010, which is a continuation of U.S. Pat. No. 7,675,257, filed Mar. 9, 2007, all of which are hereby incorporated by reference herein in their entirety.

BACKGROUND OF THE INVENTION

This invention relates generally to electronically commutated motors, and more specifically, to methods and systems for recording operating information of an electronically commutated motor.

Power control systems for electronically commutated motors (ECM), sometimes referred to as brushless direct current (DC) motors, are utilized to control the operation of ECMs. More specifically, a processing device such as a microcontroller may be utilized in a power control system to control the operation of ECMs. Occasionally, in some cases because of the speeds, loads, and voltages involved with ECM operation, an ECM or power control system may fail.

A common failure mode for microcontroller based power control systems is a cascading type failure. This type of failure may begin with a power switch failure, which may allow a low voltage circuit, such as a power control system, to be overloaded by a high voltage and fail.

BRIEF DESCRIPTION OF THE INVENTION

In one aspect, a unit for recording operating information of an electronically commutated motor (ECM) is provided. The unit includes a system controller communicatively coupled to an ECM. The system controller includes a processing device configured to control the unit. The unit also includes a memory device communicatively coupled to the system controller. The memory device is configured to receive and store ECM operating information provided by the processing device.

In another aspect, a method for providing a system to record operating information of an electronically commutated motor (ECM) is provided. The method includes configuring a processing device to collect operating data from an ECM, configuring the processing device to identify at least one of an ECM failure and a system controller failure, and configuring a memory device to receive and store the ECM operating data after at least one of an ECM failure, a system controller failure, and a user provided shut-down instruction.

In yet another aspect, a motor system is provided. The system includes an electronically commutated motor (ECM), a controller communicatively coupled to the ECM, the controller includes a processing device configured to control operation of the ECM, and a memory device communicatively coupled to the processing device. The memory device is configured to receive and store operating information collected by said processing device.

In yet another aspect, a method for recording operating information of an electronically commutated motor (ECM) is provided. The method includes collecting operating data from the ECM, identifying at least one of an ECM failure and a system controller failure, and storing the ECM operating data after identifying at least one of an ECM failure, a system controller failure, and a user provided power-down instruction.

In another aspect, a motor controller for an electric motor includes an enclosure and a processing device, memory device, and communication interface disposed within the enclosure. The processing device is configured to control the electric motor and collect operating information from the electric motor during operation of the electric motor. The memory device is communicatively coupled to the processing device. The memory device is configured to receive and store the operating information collected during operation of the electric motor. The a communication interface is communicatively coupled to the processing device and the memory device, and is configured to enable access to the operating information stored on the memory device by a computing device disposed remotely from the electric motor.

In another aspect, a method of collecting operating information for an electric motor is provided. The method includes controlling, by a processing device disposed local to the electric motor, operation of the electric motor to generate the operating information. The method includes writing the operating information to a memory device disposed local to the electric motor. The method includes transmitting the operating information to a computing device disposed remotely from the electric motor and coupled to the electric motor via a communication interface, for at least one of storage or display at the computing device.

DETAILED DESCRIPTION OF THE INVENTION

Figure 1:
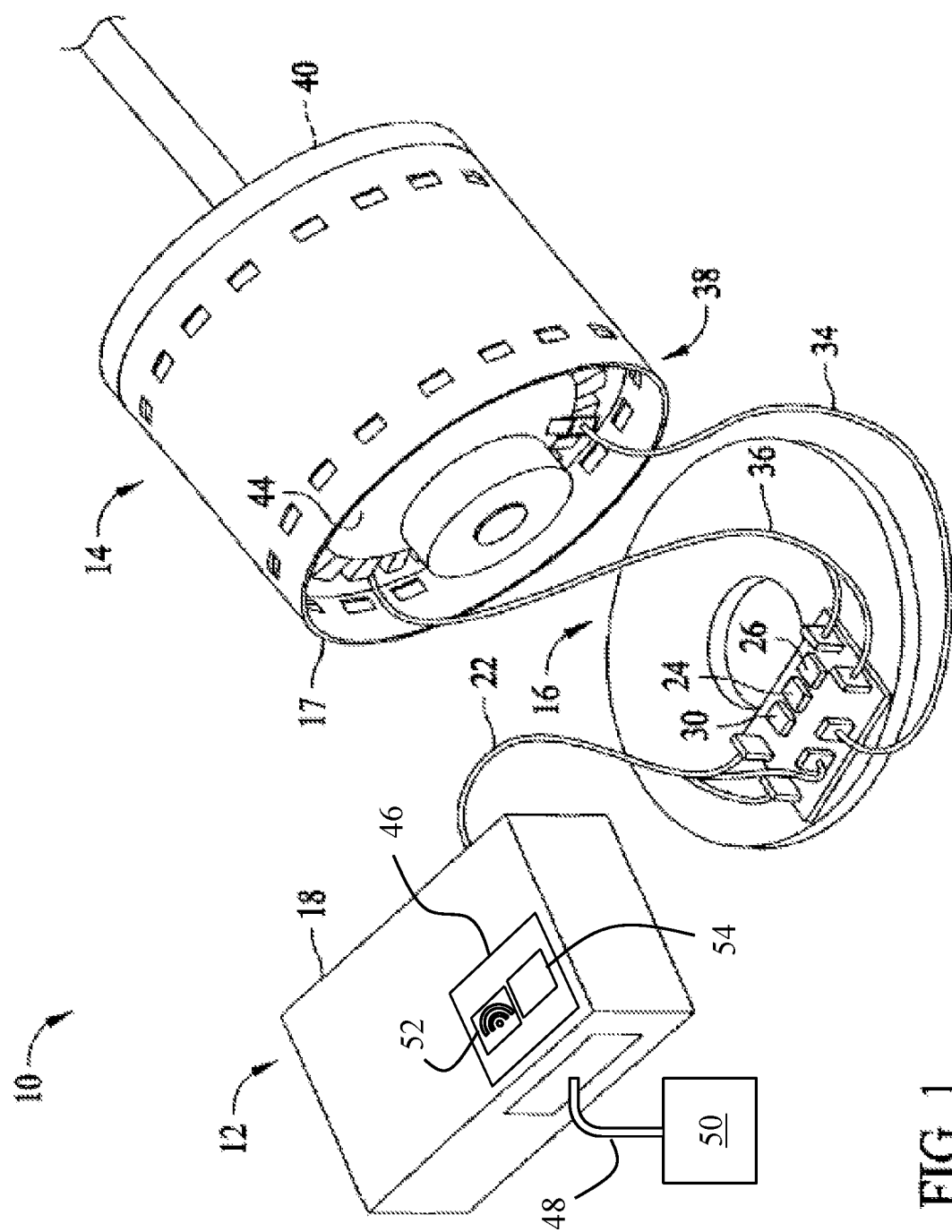
FIG. 1 is an illustration of an electronically commutated motor (ECM) coupled to a motor controller.

FIG. 1 is an illustration of an electronically commutated motor (ECM) control assembly 10 including a control module 12, an ECM 14 (also referred to as a permanent magnet DC brushless motor) and an end shield 16. When fully assembled, end shield 16 and the components mounted thereon, are mechanically coupled to a motor shell 17. Control module 12 includes a printed circuit board (not shown in FIG. 1) enclosed within an enclosure 18. In one embodiment, the printed circuit board includes a processing device, for example a microprocessor, configured to control output signals from the printed circuit board in order to control the operating characteristics of ECM 14.

In another embodiment, the printed circuit board is populated with a plurality of electronic components (not shown) coupled to the printed circuit board and each other to control output signals from the printed circuit board in order to control the operating characteristics of ECM 14. The configuration of the microprocessor and the electronic components is variable, based on at least one requirement of a user. In an exemplary embodiment, control module 12 is mounted remotely from ECM 14 and end shield 16. In another embodiment, control module 12 is mounted to an external surface of ECM 14. In yet another embodiment, a plurality of control modules are electrically coupled serially such that each control module is configured to control a motor operating characteristic.

Control module 12 is electrically coupled to end shield 16 by a cable 22. Also, end shield 16 is electrically coupled to ECM 14 by cables. Control module 12 is also electrically coupled to a user's power supply and interface circuitry (not shown in FIG. 1). The components mounted on end shield 16 include, in an exemplary embodiment, a bridge inverter 24 which is electrically coupled to a gate drive circuit 26. Bridge inverter 24 and gate drive circuit 26 are electrically coupled to at least one power switch 30. Gate drive circuit 26 is electrically coupled to a motor rotor position sensing circuit (not shown in FIG. 1) by a cable 34. Gate drive circuit 26 is also electrically coupled to ECM 14 by a cable 36.

In an exemplary embodiment, ECM 14 includes a single phase salient pole stator assembly, indicated generally at 38, including a stator core 40 formed from a stack of laminations made of a highly magnetically permeable material, and windings (not shown) of magnet wire wound on stator core 40 in a way known to those of ordinary skill in the art. A rotor 44 includes a rotor core (not shown) formed from a stack of laminations made of a magnetically permeable material substantially received in a central bore of stator core 40. Rotor 44 and stator 38 are illustrated as being solid in FIG. 1 for simplicity, their construction being well known to those of ordinary skill in the art. While FIG. 1 is an illustration of a single phase ECM and associated control circuitry, three phase ECMs and similar associated control circuitry are also known.

Figure 2:
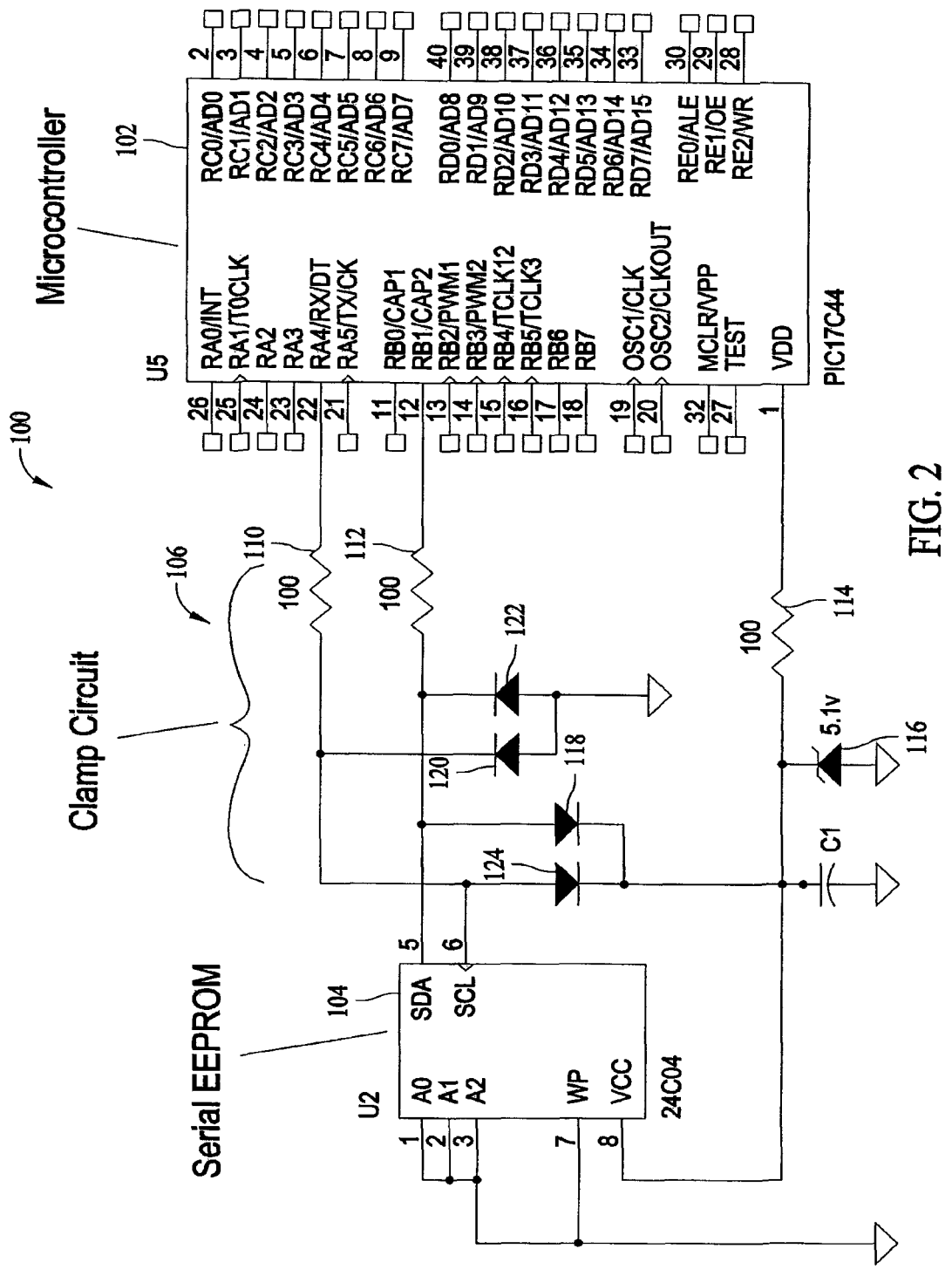
FIG. 2 is a schematic diagram of a recording system, including a processing device and a memory device.

FIG. 2 is a schematic diagram of a recording system 100 including a processing device 102, a memory device 104, and a protective circuit 106. Memory device 104 is communicatively coupled to processing device 102. In one embodiment, recording system 100 is positioned within control module 12 and on the printed circuit board (not shown in FIG. 1) described above. Processing device 102 is a part of an ECM controller that controls the operation of an ECM. In one example, processing device 102 is communicatively coupled to a device that shifts the logic level switching signals output by processing device 102 to the level of voltage used by power switches that provide power to an ECM.

In the embodiment shown in FIG. 2, processing device 102 is a PIC17C44 8-bit CMOS EPROM/ROM Microcontroller, available from Microchip Technology Inc. of Chandler, Ariz. However, as used herein, the term processing device, as in processing device 102, is not limited to just those integrated circuits referred to in the art as a processing device, but broadly refers to: a processor, a microprocessor, a digital signal processor, a controller, a microcontroller, a programmable logic controller, an application specific integrated circuit, and other programmable circuits.

Processing device 102 includes a Random Access Memory (RAM) configured to temporarily store predetermined operating information. Memory device 104 is configured to receive and store data from processing device 102. The data from processing device 102 may be transferred to memory device 104 directly after it is received by processing device 102 or transferred to memory device 104 after being temporarily stored in the RAM of processing device 102.

Recording system 100 also includes a communications interface 46 (shown in FIG. 1) that is configured to allow a user to access the data stored by memory device 104 therethrough. In an exemplary embodiment, a cable 48 is connected to communications interface 46 and in communication with a computing device 50, for example, a personal digital assistant (PDA) or a personal computer. Once connected, the data stored by memory device 104 is downloaded to computing device 50 for viewing and analysis by a user. Communications interface 46 may additionally or alternatively include a wireless transmitter 52, for example, a radio transmitter. Computing device 50 may be configured to establish a connection with wireless transmitter 52 and download the data stored by memory device 104 to computing device 50. In yet another embodiment, communications interface 46 is configured to connect recording system 100 to a network (not shown) via a network connector 54. A user that is able to access the network may also access the contents of memory device 104.

In operation, the data stored by memory device 104 is accessed by a user, in one embodiment, specifically so that a user can recover a record of operating conditions prior to a failure, for example, at least one of an ECM failure or an ECM controller failure. A record of the conditions prior to a failure allows a user to analyze the cause of the failure, diagnose a specific area within a motor and motor control system to fix or replace, and prevent future failures through adjustments to failure-causing parts.

In an exemplary embodiment, processing device 102 updates a record of motor operating conditions at periodic intervals and stores those records in the RAM of processing device 102. The periodic intervals are chosen such that the conditions prior to a failure can be recovered and analyzed. Processing device 102 also detects when a failure is occurring or has occurred. Once a failure is detected, processing device 102 will not overwrite the data stored in the RAM so that the conditions prior to the failure can be recovered and analyzed.

In one embodiment, the RAM in processing device 102 stores historic information about conditions predetermined by a user to be of interest, for example, unusual conditions or events. These unusual conditions or events may include, but are not limited to, a peak control module temperature, a fault detection event count, and a start failure count.

In operation, processing device 102 transfers the information stored in the RAM to memory device 104. The transfer of the information stored in the RAM to memory device 104 may occur at a set time interval, at a power-down, or when a failure is detected by processing device 102. A power-down occurs when the power supply to the recording system is interrupted.

In an exemplary embodiment the data received and stored by memory device 104 may include, but is not limited to, a total powered time of the ECM, a total run time of the ECM, a total time operated in a cutback region, a total time over a preset thermal limit, a total number of run cycles, temperature extremes, a last operating torque level, a last operating bus voltage, a last operating speed, a last control module temperature, a count of fault events, a count of reset cycles, a count of oscillator stop events, a count of stall events, and "scratch-pad" events.

Memory device 104 may also be provided with, and store, production process information. This information may be copied to memory device 104 at the completion of a memory test, and may include a copy of a factory calibration including passmarks and other process records. The production process information is stored by memory device 104 so that the information will not be lost in the case of a catastrophic failure.

As stated above, the total powered time of an ECM may be received and stored by memory device 104. The total powered time of an ECM is the total length of time that the ECM has received power. In an exemplary embodiment, RAM variables for powered time are incremented within processing device 102 at each pass through a main program loop. This information is saved to memory device 104 at, for example, a power-down of recording system 100 or at the time of a detected failure.

The total run time of an ECM is the total length of time that the ECM has operated at or above a preset threshold. In an exemplary embodiment, RAM variables for run time are incremented if the motor is running and the product of speed and torque meets or exceeds a preset threshold (e.g., approximately 80% of full power). This information is saved to memory device 104 at, for example, a power-down of recording system 100 or at the time of a detected failure.

The total time in a cutback region is the total length of time that the ECM has operated at a speed that exceeds a preset rate of speed. In an exemplary embodiment, RAM variables for time in the cutback region are incremented if the ECM is running and the speed exceeds the preset rate of speed (e.g., approximately 80% of the speed when ECM is operating at full power). This information is saved to memory device 104 at, for example, a power-down of recording system 100 or at the time of a detected failure.

The total time over a thermal limit is the total length of time that the ECM has operated with the ECM baseplate temperature exceeding a preset thermal limit. In an exemplary embodiment, RAM variables for total time over a thermal limit are incremented if the motor is running and the ECM baseplate temperature exceeds the thermal limit setting. This information is saved to memory device 104 at, for example, a power-down of recording system 100 or at the time of a detected failure.

The total run cycles of an ECM is a count of the number of times an ECM is started. In an exemplary embodiment, RAM variables for operating cycles are incremented every time a start is successful. This information is saved to memory device 104 at, for example, a power-down of recording system 100 or at the time of a detected failure.

Examples of the temperature extremes that may be stored are a minimum and a maximum ECM temperature. In an exemplary embodiment, a value representing the minimum ECM temperature and a value representing the maximum ECM temperature are saved to memory device 104 at, for example, a power-down of recording system 100 or at the time of a detected failure. In an exemplary embodiment, the values representing the minimum ECM temperature and the maximum ECM temperature are stored in the form of RAM words.

The last operating torque level may also be stored by memory device 104. In an exemplary embodiment, a value representing the last measured torque level before operation ceased is saved to memory device 104 at a power-down of control module 12 or at the time of a detected failure. In an exemplary embodiment, the value representing the last measured torque level before operation ceased is stored in the form of a RAM word.

The last operating bus voltage may also be stored by memory device 104. In an exemplary embodiment, a value representing the last measured bus voltage is saved to memory device 104 at a power-down of control module 12 or at the time of a detected failure. The decision to store this data is made when the bus voltage has fallen below a preset limit, so an older copy of the bus voltage measurement must be used. In an exemplary embodiment, approximately once every 936 ms, a bus voltage reading is stored in a three level memory buffer so that the history of the bus voltage is available, and the peak bus voltage may be selected and saved to memory device 104.

A last operating speed may also be stored by memory device 104. In an exemplary embodiment, a value representing the last operating speed is saved to memory device 104 at a power-down of control module 12 or at the time of a detected failure. In an exemplary embodiment, the value representing the last operating speed is stored in the form of a RAM word.

A last module temperature may also be stored by memory device 104. In an exemplary embodiment, a value representing the last module temperature is saved to memory device 104 at a power-down of control module 12 or at the time of a detected failure. In an exemplary embodiment, the value representing the last module temperature is stored in the form of a RAM word.

A count of fault events may also be stored by memory device 104. In an exemplary embodiment, RAM variables for fault events are incremented every time a fault intervention runs. Examples of a fault event include, but are not limited to, a circuit connection failure, a component failure, and a software failure. This information is saved to memory device 104 at, for example, a power-down of recording system 100 or at the time of a detected failure.

A count of reset cycles may also by stored by memory device 104. In an exemplary embodiment, RAM variables for reset cycles are incremented each time the initialization routine runs. This information is saved to memory device 104 at, for example, a power-down of recording system 100 or at the time of a detected failure.

A count of oscillator stop events may also be stored by memory device 104. In an exemplary embodiment, RAM variables for oscillator failure are incremented each time the clock fail interrupt runs. This information is saved to memory device 104 at, for example, a power-down of recording system 100 or at the time of a detected failure.

A count of stall events may also be stored by memory device 104. In an exemplary embodiment, RAM variables for operating cycles are incremented every time a start is unsuccessful. This information is saved to memory device 104 at, for example, a power-down of recording system 100 or at the time of a detected failure.

Each type of information stored by memory device 104 may be stored separately, but also may be stored in groups. For example, a section of memory in memory device 104 may be used to store a pairing of different types of information. Relevant information may be extracted from not only each individual type of information, but also from the results of a comparison of different types of information. In an exemplary embodiment, a measured value may be paired with a representation of the time that the measured value was obtained.

Memory device 104 may also provide storage of miscellaneous information. Storage of miscellaneous information, which may include any information a user would like to store, is referred to herein as a scratch-pad memory function of memory device 104. The miscellaneous information may include information about the system controller which can be used by a successor system controller in the case the original system controller is replaced. The information about the system controller may also identify and track the motors that have been connected to the system controller.

In an exemplary embodiment, at least sixteen blocks (16 byte size) of memory within memory device 104 are reserved for the scratch-pad memory function. The scratch-pad memory function is used by the customer for storage and retrieval of miscellaneous information via special serial commands that specify the block number where the particular information is stored. It is the responsibility of the system control designer to regulate this usage so that the write endurance of the part is not exceeded (e.g., 1 million cycles is typical for an EEPROM).

In the exemplary embodiment of FIG. 2, memory device 104 is an Electronically Erasable Programmable Read-Only Memory (EEPROM or $E^2$PROM). EEPROM may be onboard processing device 102 or external to processing device 102. In an alternative embodiment, memory device 104 is a flash memory device. Furthermore, any type of non-volatile memory device capable of communicating with a processing device and storing data from a processing device may be used.

More specifically, processing device 102 may be a serial EEPROM. In an exemplary embodiment, shown in FIG. 2, an inter-integrated circuit (IIC) interface communicatively couples processing device 102 and memory device 104. In another exemplary embodiment (not shown in FIG. 2), a Serial Peripheral Interface (SPI) communicatively couples processing device 102 and memory device 104. An IIC interface requires one less connection between processing device 102 and memory device 104 than an SPI. The IIC interface may be advantageous because the one extra connection necessary for an SPI requires extra components within clamp circuit 106 and an extra pin available on both microcontroller 102 and memory device 104.

The transfer of the information stored in the RAM of processing device 102 to memory device 104 consumes processor time. In an exemplary embodiment, timer interrupts in the motor drive are allowed to run during a transfer of information between the RAM and the memory device 104. This ensures that motor operation is not interrupted by memory transfers. Copies of the information to be transferred are loaded onto the RAM and written back to the EEPROM at intervals or when the power is failing.

In an exemplary embodiment, the API functions have the form of a block move, performed discontinuously by means of multiple passes through a state machine. More specifically, the firmware environment has a main loop that contains a call to the state machine. If there is a transfer pending, some predetermined number of words is transferred, until enough passes have occurred to complete the range.

In this embodiment, the lower level operations are divided into separate calls, such that a single word transfer is done without going through the state machine simply by doing a series of subroutine calls. Dividing the lower level operations into separate calls allows usage of single words in the device without waiting for the main loop to do the transfer.

In an exemplary embodiment, write enable/disable functions are included inside the API functions. The memory device 104 is left in the write disabled state between function calls. The API function may define a maximum block transfer size allowed. In one embodiment, the API function defines the maximum block transfer size allowed only if the maximum block transfer size is less than 255. Processing device 102 performs a range check comparing a string length against the maximum block transfer size.

In this exemplary embodiment, the API may also define a number of words to transfer per each pass through the state machine. This allows the transfer rate to be adjusted in response to its environment.

The API may also include values for the highest and lowest RAM locations allowed. The processing device 102 is configured to terminate a transfer if the RAM destination address is outside this range.

In an exemplary embodiment, port pin data direction and level are saved at the beginning of a call and restored at the end. Saving in this manner allows the EEPROM interface to coexist with other functions.

Referring further to FIG. 2, protective circuit 106 limits the terminal voltage at memory device 104. Limiting the terminal voltage at memory device 104 prevents damage to memory device 104 and damage to information (i.e., loss of the information or corruption of the information) stored on memory device 104. Protective circuit 106 may be located anywhere within recording system 100, and may be composed of any component or combination of components, so long as recording system 100 is configured in such a way that memory device 104 survives a motor failure and/or a motor controller failure. Memory device 104 survives a motor failure and/or a motor controller failure when the information stored on memory device 104 is not lost or corrupted and is accessible to a user after a motor failure and/or a motor controller failure. Since one of the objectives of recording system 100 is to store operating conditions immediately before a failure, memory device 104 is protected from damage by high voltages through the inclusion of protective circuit 106.

In another exemplary embodiment, memory device 104 includes protective circuitry or at least one component configured to prevent damage to the information stored on memory device 104. As described above, during a motor or a motor controller failure, low voltage components may be exposed to voltages high enough to damage the low voltage components such as processing device 102 and memory device 104.

In an exemplary embodiment, protective circuit 106 is a clamp circuit. In the embodiment of FIG. 2, clamp circuit 106 includes a series impedance 110, 112, and 114 in each of the connections between memory device 104 and processing device 102 and also circuitry to limit the terminal voltage at memory device 104. In an exemplary embodiment, the circuitry to limit the terminal voltage at memory device 104 may be implemented with Zener diodes, such as Zener diode 116. In the exemplary embodiment of FIG. 2, four signal diodes 118, 120, 122 and 124 are connected with the data lines, and one Zener diode 116 is connected to the Vcc pins of processing device 102 and memory device 104. However, alternative configurations of protection circuits may be used, including a configuration using three Zener diodes (not shown in FIG. 2). The values of series impedances 110, 112, and 114 are chosen such that the fault currents conducted by signal diodes 118, 120, 122, and 124 will cause series impedances 110, 112, or 114 to open and protect memory device 104 by clearing the current path. As mentioned above, other types of serial EEPROM memory may use three or four data lines which would each be clamped in a similar manner in order to limit the terminal voltage at memory device 104.

Figure 3:
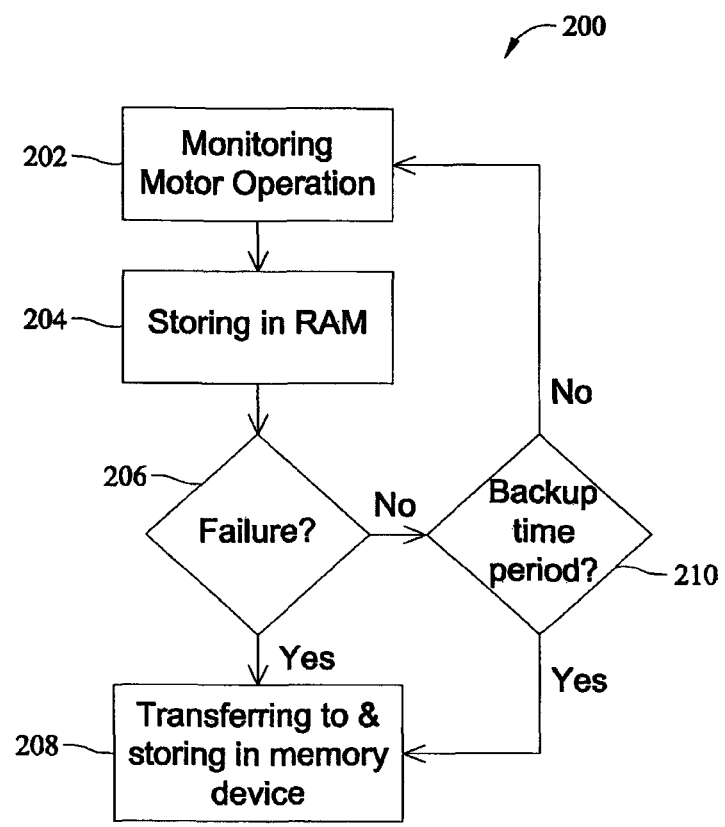
FIG. 3 is a block diagram of a method of recording ECM operating data.

FIG. 3 is a flow chart of a method 200 of storing information using recording system 100. Method 200 includes configuring processing device 102 to monitor ECM operation 202. As described above, motor operating information may be stored on memory device 104 and may include the total powered time, total run time, total run cycles, etc. Each type of operating information predetermined to be recorded is first monitored and collected by processing device 102.

Method 200 also includes storing 204 the operating information in the RAM of processing device 102. In one embodiment, processing device 102 collects one type of motor operation information and temporarily stores that piece of information in the RAM. After a predetermined time period, processing device 102 re-records the same type of motor operation information and replaces the previous information stored in the RAM with the more recently collected information. Updating the motor operation information as described above ensures that should a failure occur, the information is stored at a point in time that is close to the time of the failure.

In another example embodiment, processing device 102 collects one type of motor operation information and temporarily stores that piece of information in the RAM. After a predetermined time period, processing device 102 collects an updated version of the same type of motor operation information and compares it to the information stored in the RAM. Depending on how processing device 102 is configured, processing device 102 will either replace the older information with the updated version of the information, or continue to store the older information. Information such as temperature extremes (e.g. high and low ECM operating temperatures) are stored in the RAM in this manner.

In yet another exemplary embodiment, processing device 102 monitors one aspect of motor operation. When the aspect of motor operation being monitored by processing device 102 meets a specific criteria, a RAM variable is incremented to track the number of times that the aspect being monitored occurred or the length of time that the aspect being monitored occurred. Aspects of motor operation, for example, the number of reset cycles and the total time over a thermal limit are stored in the RAM in this manner.

Method 200 further includes determining 206 whether a motor or motor controller failure is occurring or has occurred. Determining 206 whether a motor or motor controller failure is occurring or has occurred includes configuring processing device 102 to recognize when a motor or motor controller failure is occurring or has occurred. When a failure is determined, method 200 includes transferring 208 the information stored in the RAM to the memory device for secure storage of pre-failure operating conditions.

Method 200 also includes scheduling 210 the transfer of the information stored in the RAM to the memory device 104. More specifically, method 200 includes transferring 208 the information stored in the RAM to memory device 104 after the expiration of a preset time period. If a failure is not determined, the processing device continues monitoring motor operation 202.

Figure 4:
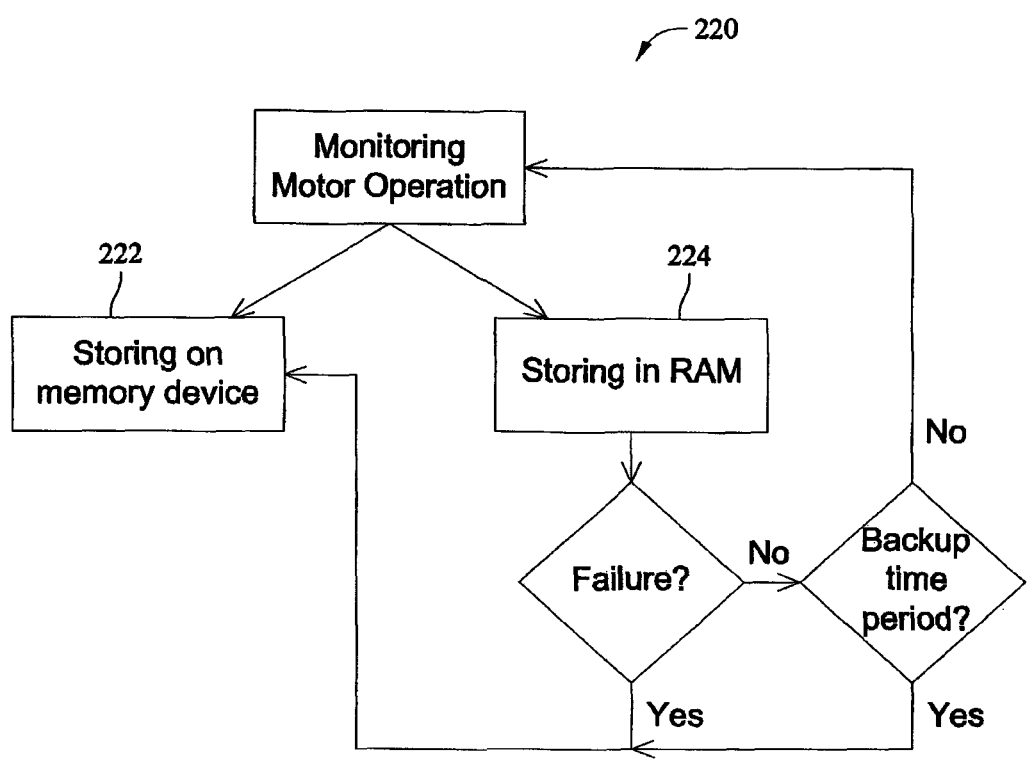
FIG. 4 is a block diagram of a method of recording ECM operating data.

FIG. 4 is another embodiment of a method 220 of storing information using recording system 100. Method 220 is similar to method 200, however, method 220 includes processing device 102 directly transferring 222 motor operating information to memory device 104. Method 220 includes processing device 102 storing 224 certain predetermined information in the RAM of processing device 102, while also storing 222 certain predetermined information directly on memory device 104.

In an exemplary embodiment, processing device 102 may be configured to retrieve instructions from memory device 104. In an exemplary embodiment, processing device 102 is configured to retrieve instructions from a predetermined location within memory device 104 after a specific type of operating information monitored by processing device 102 reaches a predetermined measurement or count. Storing contingent operating instructions in memory device 104 allows control of the ECM to be customized automatically in response to a measured operating condition.

To summarize, a non-volatile memory is included in the associated circuitry of a processing device based ECM control. The memory allows the processing device to store information about the operating environment history of the motor. The operating environment history of the motor can be retrieved from the memory and analyzed after a motor or motor controller failure. The operating environment history of the motor can also be retrieved at any time from the memory and analyzed in order to aide a user in optimizing the system over time. The memory is protected from potentially damaging voltages by circuitry designed to limit voltage. The protective circuitry protects the memory from the effects of a failure that may destroy the associated processing device or motor. Protecting the memory allows a user to retrieve from the memory the operating environment history of the motor from a time prior to the failure even after the destruction of the motor and/or the processing device.

Finally, the memory and processing device together provide a secondary storage medium for information that is useful to the system controller. The processing device may be configured to retrieve operating instructions from the memory after receiving a predetermined level or count of a particular type of operating data the processing device had been monitoring.

The term "user", as used herein, includes a human operator, as well as systems and applications. Therefore, the term user is not limited to being a human, and in many instances references a system or application that includes software operating on a processor. In addition, the terms "data", "message", "information", and "file" are sometimes used herein interchangeably, and each of those terms broadly refer to information in any format.

While the invention has been described in terms of various specific embodiments, those skilled in the art will recognize that the invention can be practiced with modification within the spirit and scope of the claims.

What is claimed is:

1. A motor controller for an electric motor, said motor controller comprising:
    an enclosure;
    a processing device disposed within said enclosure and configured to:
        control the electric motor; and
        collect operating information including measured values and corresponding timestamps from the electric motor during operation of the electric motor;
    a memory device disposed within said enclosure and communicatively coupled to said processing device, said memory device configured to receive and store the operating information including overwriting previously stored measured values with the measured values with a corresponding most recent timestamp; and
    a communication interface disposed within said enclosure and communicatively coupled to said processing device and said memory device, said communication interface configured to enable access to the operating information stored on said memory device by a computing device disposed remotely from the electric motor.

2. The motor controller of claim 1, wherein said communication interface comprises a connector configured to receive a cable couplable to the computing device to form a direct physical connection with the computing device.

3. The motor controller of claim 1, wherein said processing device is further configured to collect at least one of a voltage, a current, a torque, a time, a power, a temperature, or a speed.

4. The motor controller of claim 1, wherein said processing device is further configured to collect data indicating a fault event has occurred.

5. The motor controller of claim 1, wherein said processing device is further configured to overwrite, in said memory device, the previously stored operating information with the operating information including the measured values with the most recent timestamp at periodic intervals.

6. The motor controller of claim 5, wherein said processing device is further configured to:
   detect a failure event has occurred; and
   disable overwriting the operating information stored in said memory device.

7. The motor controller of claim 1, wherein said memory device comprises at least one random access memory device.

8. A method of collecting operating information for an electric motor, said method comprising:
   controlling, by a processing device disposed local to the electric motor, operation of the electric motor to generate the operating information including measured values and corresponding timestamps;
   writing the operating information to a memory device disposed local to the electric motor, said writing comprising overwriting previously written operating information with the measured values including a corresponding most recent timestamp;
   transmitting the operating information to a computing device disposed remotely from the electric motor and coupled to the electric motor via a communication interface, for at least one of storage or display at the computing device.

9. The method of claim 8, further comprising connecting the electric motor to the computing device with a cable for transmission of the operating information via the cable.

10. The method of claim 8 further comprising collecting at least one of a voltage, a current, a torque, a time, a power, a temperature, or a speed for the electric motor.

11. The method of claim 8 further comprising collecting data from the electric motor indicating a fault event has occurred.

12. The method of claim 8, wherein said writing the operating information to the memory device further comprises overwriting the previously written operating information with the operation information including the measured values with the most recent timestamp at periodic intervals.

13. The method of claim 12, further comprising:
   detecting, by the processing device, that a failure event has occurred; and
   disabling said overwriting.

14. The method of claim 8, wherein writing the operating information to the memory device comprises writing to a random access memory device.

* * * * *